(12) United States Patent
Duerdodt et al.

(10) Patent No.: US 8,780,959 B2
(45) Date of Patent: Jul. 15, 2014

(54) INTEGRATED TRANSCEIVER LOOP BACK SELF TEST BY AMPLITUDE MODULATION

(75) Inventors: Christian Duerdodt, Bochum (DE); Rainer Kreienkamp, Bochum (DE); Jens Kissing, Boenen (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1570 days.

(21) Appl. No.: 12/352,773

(22) Filed: Jan. 13, 2009

(65) Prior Publication Data

US 2010/0177811 A1 Jul. 15, 2010

(51) Int. Cl.
*H04B 1/38* (2006.01)
*H04L 5/16* (2006.01)

(52) U.S. Cl.
USPC ........... 375/219; 375/220; 375/221; 375/224; 375/226

(58) Field of Classification Search
USPC .................. 375/219–221, 224, 226, 371–376
See application file for complete search history.

(56) References Cited

U.S. PATENT DOCUMENTS

| | | | |
|---|---|---|---|
| 6,346,910 B1 * | 2/2002 | Ito | 342/174 |
| 7,061,260 B2 * | 6/2006 | Frankowsky et al. | 324/750.02 |
| 2004/0087279 A1 * | 5/2004 | Muschallik et al. | 455/73 |
| 2006/0063525 A1 * | 3/2006 | Hazell | 455/425 |
| 2007/0026809 A1 * | 2/2007 | Zhang et al. | 455/67.11 |
| 2008/0226288 A1 * | 9/2008 | Miller | 398/9 |

\* cited by examiner

*Primary Examiner* — Curtis Odom
(74) *Attorney, Agent, or Firm* — Eschweiler & Associates, LLC (57) ABSTRACT

This disclosure relates to radio frequency (RF) functional testing of transceivers of wireless devices.

10 Claims, 5 Drawing Sheets

INTEGRATED TRANSCEIVER LOOP BACK SELF TEST BY AMPLITUDE MODULATION

BACKGROUND

During the fabrication process of integrated circuits (IC), defective components may be produced along the production chain. Defective components may increase costs by creating additional production time and limiting production throughput. Therefore, it is important to test for such defective components to prevent such added costs of defective components. For example, an IC such as a transceiver component may be included in wireless communication devices. The transceiver component may be individually tested before it further passes along the production chain. To this end, a fast and efficient testing process of the transceiver component may have a significant effect in production costs.

A loop back test to test radio frequency (RF) functionality of the transceiver component may use external RF signal generators and external mixers (i.e., generators and mixers that are not part of the transceiver). A particular test is the loop back test to test RF functionality, where the transceiver component feeds the transmit output signal (i.e., RF frequency signal) back into the receiver component for test purposes. The external RF signal generators and mixers used to implement testing of the transmit part and the receive part in the transceiver component may require additional time and cost in the production process.

In certain implementations, the loop back test to test the RF functionality of the transceiver component may avoid the use of the external RF signal generators and mixers implemented in the transceiver component; however, the loop back test implementation may contain additional components such as a frequency shift circuit and an attenuator that are integrated into the transceiver component. During the test mode operation, the frequency shift circuit may adjust the frequency of the loop back transmit output signal into a predefined frequency of a receiver input signal to be received by the receiver. The frequency shifted transmit output signal may further undergo attenuation in the attenuator. The attenuator may adjust the amplitude of the frequency shifted transmitter output signal to substantially match a predefined amplitude of a receiver input signal received by the receiver. The predefined frequency and predefined amplitude of a receiver input signal may refer to the frequency and amplitude of the signal used as reference signals for the loop back test. A pass or fail status may be determined by comparing the measured output at a test point in the receiver output, with that of the predefined frequency and predefined amplitude as reference signals for test purposes.

A loop back test with the additional circuitry such as a frequency shift circuit and an attenuator can have disadvantages. One disadvantage may be additional area requirement, and another disadvantage may be a degradation of the circuit properties in normal operation mode. The additional area requirement may result due to the additional frequency shift circuit and attenuator implemented in the transceiver chip. The degradation of the circuit properties in the normal operation mode may result due to attenuations produced by switches added by the frequency shift circuit and attenuator.

A transceiver component may also use a single phase locked loop (PLL) to support both transmit and receive components; however, with a PLL, the disadvantages of additional area requirements may be further emphasized. In order to correct the additional area requirements, a loop back self test using the functional circuit components may be performed by applying an amplitude modulation in the receiver component. The amplitude modulation, which may include low frequency modulation, may be applied in the receiver component to modulate the received RF signal from the loop back transmit output. A measurement at a test point in the receiver component output may include signal strength measurement (due to amplitude modulation), to determine the pass or fail status of the transceiver component.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

This disclosure is directed towards techniques and methods of performing Radio Frequency (RF) test in a transceiver component using a loop back self test. The loop back self test may be implemented by using the functional circuit components by applying amplitude modulation at the loop back RF frequency signal. The functional circuit components are defined as components/circuits that are used in normal operation of the transceiver component. The amplitude modulation of the loop back RF frequency signal may undergo the normal demodulation process in the receiver component and measured at a test point in the receiver component output for the pass or fail status of the transceiver component under test. The use of the functional circuit components avoids further area requirements due to the use of added test components/circuitry and eliminates degradation of the circuit properties due to switching attenuations.

Figure 1:
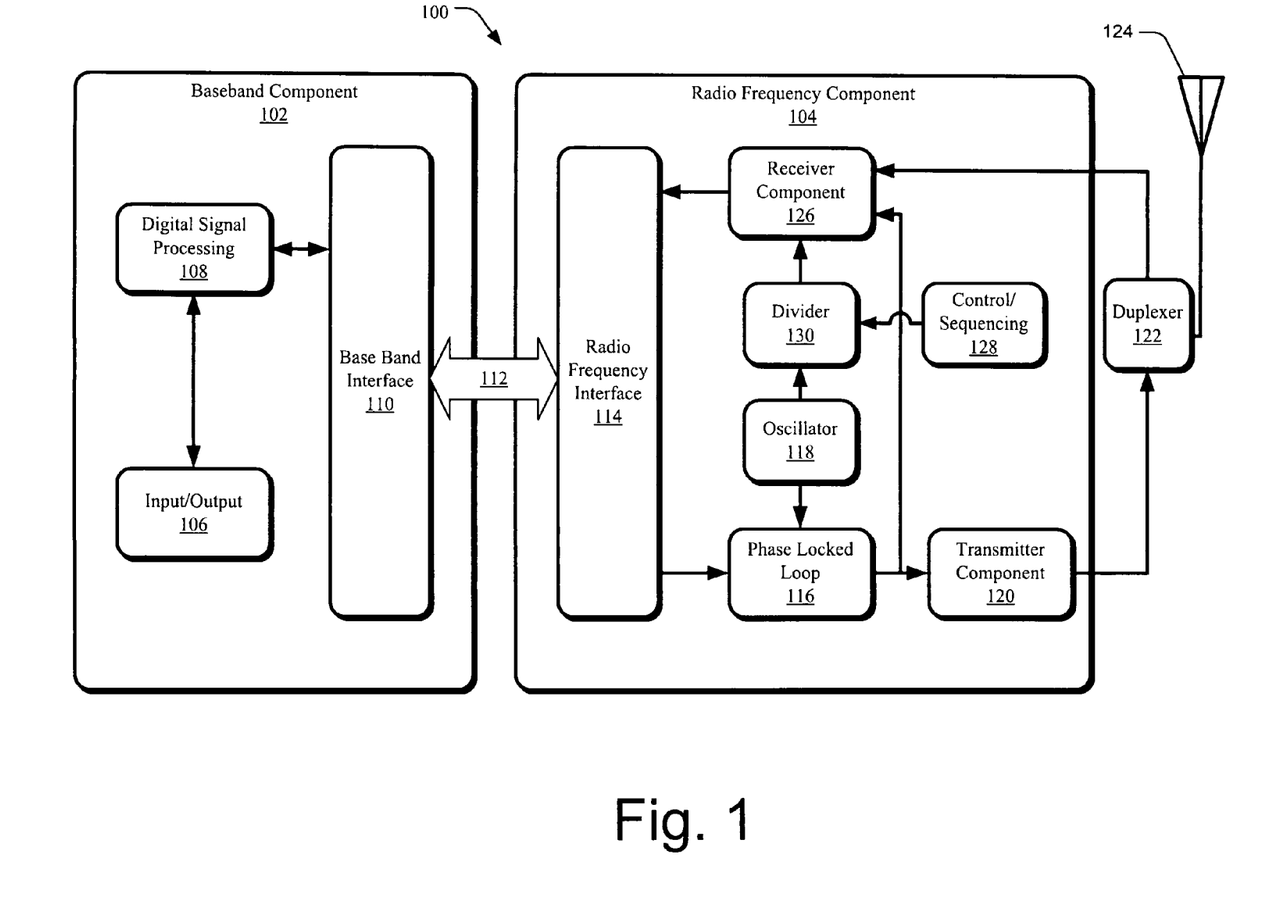
FIG. 1 is a block diagram of a transceiver component with a loop back self test using the functional circuit components by applying amplitude modulation.

FIG. 1 illustrates a transceiver 100 that includes a baseband component 102 and a RF component 104. During transmission and normal mode operation, baseband component 102 may encode a data signal, identify the data signal's prior state before modulation, and may transmit the data signal for modulation, where output from the baseband component 102 is referred to as a baseband signal. During demodulation, baseband component 102 may identify the prior state of the data signal following demodulation. The baseband component 102 decodes the demodulated data signal to re-create the data signal. The prior state of the data signal may include attributes of the data signal, such as amplitudes of the Inphase (I) signal and Quadrature phase (Q) signal, frequency, or phase amount.

During modulation and normal mode operation, RF component 104 may combine the baseband signal with the RF frequency carrier to produce the modulated RF frequency signal, amplify the modulated RF frequency signal, and further filter the modulated RF frequency signal before transmission. During receiving, the RF component 104 may receive the modulated RF frequency signal, amplify the modulated RF frequency signal, filter the modulated RF frequency signal, and demodulate the modulated RF frequency signal.

A test mode operation for the transceiver component may use the functional circuit components of the RF component 104. A loop back self test may be performed by feeding the transmit output signal into the receiver input. In certain implementations, the transmit output signal may contain a RF frequency signal that is amplitude modulated in a low noise amplifier (LNA) component of the receiver component front end. The amplitude modulation in the LNA may be measured, after demodulation, at a test point in the receiver output as a reference for the RF functionality test of the transceiver component. The LNA component may amplify weak signals that are received during normal mode operation. During test mode operation, the LNA component may receive the RF frequency signal from the loop back transmit output signal and performs a low frequency amplitude modulation for the loop back self test using the functional circuit components by applying amplitude modulation. Although modulation via the LNA is described, it is contemplated that other methods may be implemented, such as methods implemented by a transmit output stage, power supply, current switching, etc.

Baseband component 102 may include input/output component 106 that receives data signals, for example from peripherals, display, camera, etc. The baseband component 102 converts analog data signals into digital data signals. The normal mode operation for the baseband component 102 may send the digital data signals to a digital signal processor (DSP) 108. The DSP 108 may receive the digital data signals and filter the digital data signals to limit the bandwidth forming a spectrum equivalent low pass signal or baseband signal. The baseband signal may include the amplitudes of Inphase signal (I) and Quadrature phase signal (Q).

The baseband signal from DSP 108 may pass through a digital interface connecting the baseband component 102 and RF component 104. The digital interface may contain a baseband interface 110, signal interface 112, and RF interface 114. The baseband interface 110 may receive the baseband signal from the DSP 108, and transmits the baseband signal to the RF component 104 using signal interface 112. The RF interface 114 may receive the baseband signal, and sends the baseband signal to the PLL 116. The PLL 116 may modulate the RF frequency carrier with the received baseband signal using a reference frequency provided by an oscillator 118. The PLL 116 may produce a multiplied modulated RF frequency signal that is received by a transmitter component 120 for amplification and frequency reduction. The frequency reduction at the output of the transmitter component 120 may include a high band modulated RF frequency signal (e.g., 1800/1900 MHz) or low band modulated RF frequency signal (e.g., 850/900 MHz). A duplexer 122 component may be used to isolate the receiver component from the transmitter component of RF component 104, while permitting the use of a single antenna 124 during transmitting and receiving. During a test mode operation, the duplexer 122 may function as an attenuation block for loop back transmit output signal (i.e., RF frequency signal), such that the LNA circuitry will not be over driven.

During normal mode operation, receiver component 126 filters and processes the modulated RF frequency signal for demodulation. The demodulated RF frequency signal which contains the baseband signal may be transmitted to the baseband component 102 for further digital signal processing and decoding. During test mode operation, the receiver component 126 may receive the RF frequency signal from the loop back transmit output signal, and applies amplitude modulation of the loop back RF frequency signal. The amplitude modulation may undergo demodulation processes similar to the normal mode operation of the receiver component 126 (i.e., filtering, amplifying, analog to digital signal conversion, direct current offset correction, etc.), and the signal strength for the amplitude modulated RF frequency signal may be measured at a test point in the receiver component 126 output. The measurement of signal strength in the receiver component 126 output may generate the pass or fail status of the transceiver component when compared to the amplitude modulation applied into the loop back transmit output signal.

A control/sequencing component 128 may perform a first stage for the loop back self test of the transceiver 100 using the functional circuit components by applying amplitude modulation. During test mode operation, control/sequencing component 128 may enable divider 130 to divide the reference frequency from oscillator 118 and to send a low modulation frequency signal (e.g., 50.78 KHz) to the receiver component 126. The low modulation frequency signal (e.g., 50.78 KHz) may contain a control bit to toggle the LNA component gain in the receiver component 126 for amplitude modulation of the loop back transmit output signal. The control/sequencing 128 may also turn ON the transmitter component 120 and the receiver component 126 at the same time due to single PLL (e.g., PLL 116) in the transceiver 100.

Figure 2:
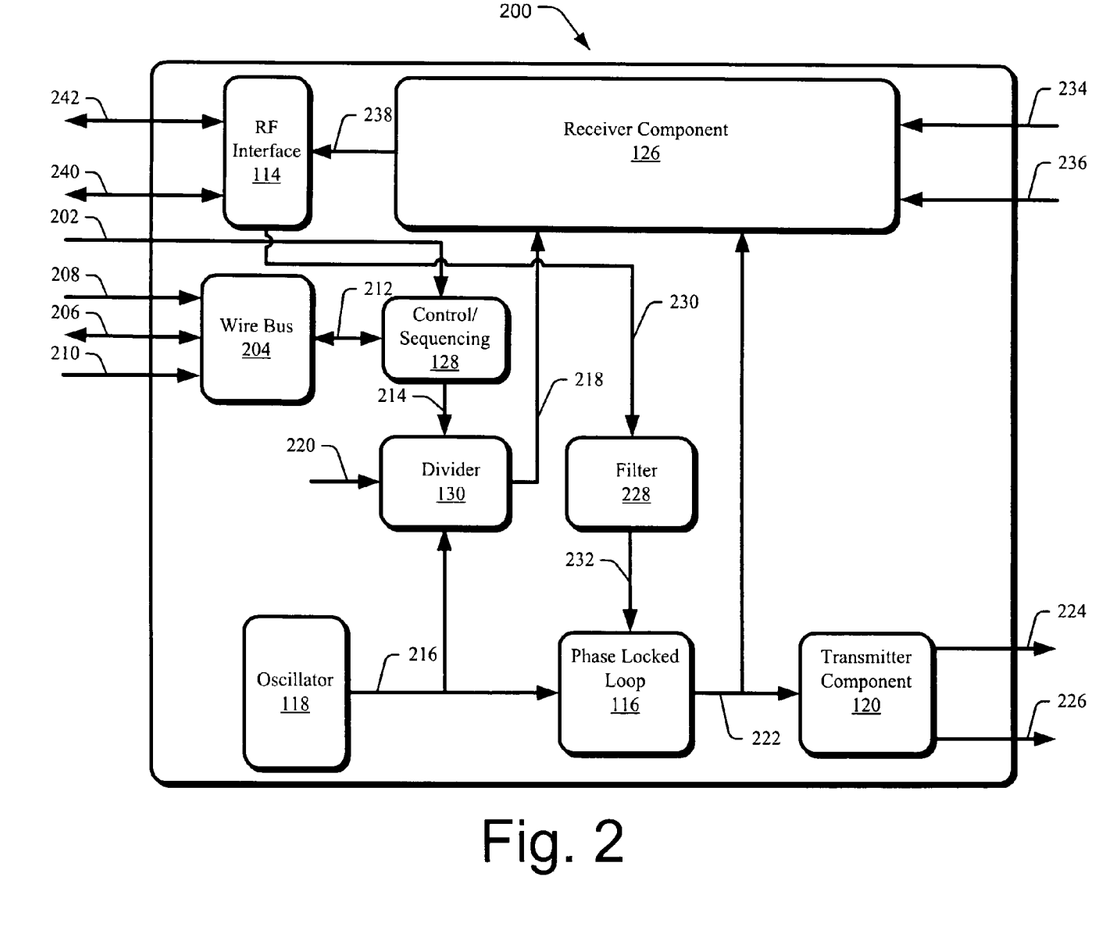
FIG. 2 is a block diagram of a Radio Frequency (RF) component.

FIG. 2 illustrates block diagram 200 representing an implementation of RF component 104 for loop back self test using the functional circuit components by applying amplitude modulation. The functional circuit components may include the existing components (e.g., PLL 116, oscillator 118, receiver component 126, transmitter component 120) of RF component 104 to be used in the RF functionality test of the transceiver 100.

Transceivers (e.g., GSM systems), such as transceiver 100, may use the single PLL to generate a transmit frequency and a receive frequency. The transmit frequency may be the RF frequency signal produced by the transmitter component 120 while the receive frequency may be the oscillator frequency fed into a mixer component to produce an intermediate frequency for demodulation. The intermediate frequency may be used to shift the frequency of the received RF frequency signal as an intermediate step to reception. The transmit frequency and receive frequency may not be generated by one PLL at the same time. Instead, the PLL may generate the transmit and receive frequency at separate time intervals using Time Division Multiplexing (TDM). TDM may be a form of multiplexing, where full duplex communications can be implemented through half duplex communication link.

Due to the single PLL, the loop back transmit output signal may have the same frequency as the receive frequency (also called oscillator frequency) entering into the mixer component and the measurements derived at the test point in the receiver output may provide no result for the pass or fail status of the transceiver component. The mixer component may provide the sum and difference of the receive frequency and the loop back transmit output frequency which may result to zero frequency for the difference, and twice the receive frequency/transmit output signal frequency for the sum. The low pass filter component subsequent to the mixer component may attenuate the higher frequency (twice the receive frequency/transmit output frequency), while the zero frequency may provide a DC or constant zero frequency at test point in the receiver output. The test point may be located in the receiver output to measure the signal strength as the basis for the pass or fail status of the transceiver component under test.

A solution to eliminate DC output or constant zero frequency, at the test point in the receiver component, may allow implementation of a low frequency amplitude modulation in the LNA component of the receiver component 126 by periodically toggling the LNA component gain (e.g., high gain to low gain). To this end, a variation may be made in the amplitude of the RF frequency signal (loop back transmit output signal) and the mixer component subsequent to the LNA component may produce a sum and difference other than zero frequency or twice the transmit frequency/receive frequency. The mixer component output, after low pass filtering, may produce a low intermediate frequency (e.g., 50.78 KHz) which may further undergo demodulation process in the receiver component 126 to produce the signal strength of the amplitude modulation.

During the test mode operation, signal 202 may be a reset signal entering the control/sequencing component 128 to start the RF functional test in the transceiver chip. The reset signal 202 may clear the status of the control/sequencing component 128 to start the RF functional test in the transceiver component. Another control signal may be sourced from wire bus 204 which may contain a control data (CTRLDA) 206 that may be an input or output to the control/sequencing component 128. The CTRLDA 206 may contain the control signal to activate the test mode operation of the transceiver and control signal to toggle the gain of the LNA component in the receiver component 126. A timing reference may be provided for CTRLDA 206 by control enable (CTRLEN) line 208 and control clock (CTRCLK) 210 for both input and output control data to the control/sequencing component 128. Signal 212 may carry the CTRLDA 206 signals into or from the control/sequencing component 128.

The control/sequencing component 128 may send a test mode signal through signal 214 to divider 130. The divider 130 may be activated and may divide the frequency from oscillator 118 to produce the modulation frequency (e.g., 50.78 KHz) for applying amplitude modulation. The test mode signal in signal 214 may also turn ON the transmitter component 120 and receiver component 126 at the same time, and provide the control bit for toggling the gain of the LNA component in receiver component 126 for applying amplitude modulation.

Divider 130 may divide the reference frequency from the oscillator 118 (e.g., 26 Mhz) into a particular modulation frequency (e.g., 50.78 KHz) for applying amplitude modulation. The amplitude modulation may be applied through periodic switching of the LNA component gain. The periodic switching may be implemented by a switching bit in the digital circuit part of the receiver component 126. The periodic switching may manipulate the LNA component gain for which, the LNA component may act like a parasitic mixer, where the parasitic mixer may result from the LNA component due to toggling of gain. A mixer component subsequent to the LNA component of the receiver component 126 may combine the modulated RF frequency signal (amplitude modulated in the LNA component acting as a parasitic mixer) with the receive frequency (oscillator frequency) to produce an intermediate frequency (IF) after filtering. The IF, which contains the information signal, may be generated by a low pass filter after mixing the modulated RF frequency signal (i.e., amplitude modulated in the LNA) and the receive frequency (oscillator frequency).

Signal 216 may carry the reference frequency (e.g., 26 MHz) from the oscillator 118 entering into the PLL 116 and the divider 130. The divider 130 may divide the reference frequency into a low modulation frequency (e.g., 50.78 KHz) and the low modulation frequency may be used for amplitude modulation in the receiver component 126 through signal 218. A self test frequency in signal 220 may contain a control signal to choose the modulation frequency output of divider 130. For example, the other modulation frequency output for signal 220 may be 25.39 KHz, 101.56 KHz, and 203.25 KHz.

During test mode operation, where no baseband signal is modulated into the PLL 116, signal 222 may carry the multiplied RF frequency signal that may be received by transmitter component 120 and receiver component 126 for further amplification and frequency division. Signal 224 may contain the low band transmitter output signal of transmitter component 120 which may include 850/900 MHz frequency range. Signal 226 may carry the high band transmitter output signal of transmitter component 120 that may include 1800/1900 MHz frequency range. The low band transmit output signal or high band transmit output signal may be the RF frequency signal that is looped back into the receiver component 126. The looped back RF frequency signal may be synchronized with the receive frequency (or oscillator frequency) entering into the receiver component 126 during test mode operation A needle connection may be used to loop back the amplified RF frequency signal into the receiver component 126 so as not to over drive the LNA component in the front end of the receiver component 126.

During normal operation mode, a filter 228 component may be used to filter the baseband signal from signal 230 before it is applied to the PLL 116 through signal 232. The PLL 116 may modulate the baseband signal into the RF carrier frequency to produce the multiplied modulated RF frequency signal.

A signal 234 may carry the low band RF frequency signal from the loop back transmit output and a signal 236 may carry the high band RF frequency signal from the loop back transmit output. The RF frequency signal may be fed into the receiver component 126 through a needle connection due to high power level of the RF frequency signal prior to transmission.

The RF frequency signal received by the receiver component 126 may undergo amplitude modulation in the LNA component and demodulation to produce the signal strength of the amplitude modulation at the test point in the receiver component 126 output. A signal 238 may contain the output of receiver component 126 which includes the signal strength of the amplitude modulation implemented in the LNA component located at the front end of receiver component 126.

A test point may be established in signal 238 which may contain the signal strength of the amplitude modulation implemented in the LNA component located at the front end of receiver component 126. The signal 238 may pass through signal 240 which may be used for concurrent bi-directional communications between the baseband component 102 and RF component 104. The timing references for the concurrent bi-directional communications between the baseband component 102 and RF component 104 may be provided by transmit/receive enable clock (RXTXEN) in signal 242.

A further implementation of the loop back self test described above may be the use of different modulation frequencies in signal 220 (e.g., 25.39 KHz, 101.56 KHz, 203.25 KHz) in order to test a frequency response of the receiver component 126 output. The frequency response may refer to a spectrum response at the test point for a varying modulation frequency signal applied for amplitude modulation in the LNA component. The manipulation of the gain in the LNA of receiver component 126 may further be substituted by periodically switching a supply voltage or a supply current of the LNA.

Figure 3:
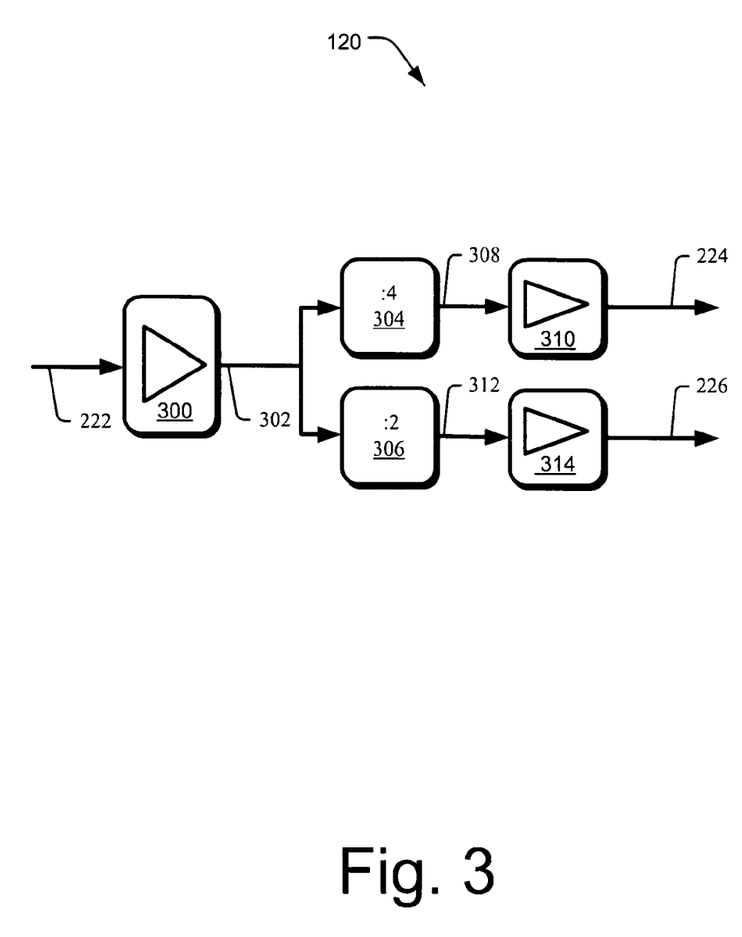
FIG. 3 is a block diagram of a transmitter component.

FIG. 3 illustrates an implementation of transmitter component 120 for the loop back self test using the functional circuit components by applying amplitude modulation. During test mode operation, an amplifier 300 may amplify the multiplied RF frequency signal 222. The amplified multiplied RF frequency signal may pass through signal 302 and received by divider 304 and divider 306. The divider 304 may divide the amplified multiplied RF frequency signal 302 by four (4) to form the low band RF frequency signal which may contain the frequency of 850/900 MHz. The divider 306 may also divide the amplified multiplied RF frequency signal 302 by two (2) to form the high band RF frequency signal which may contain the frequency of 1800/1900 MHz.

Signal 308 may carry the low band RF frequency signal from divider 304 output and the low band RF frequency signal is further amplified by amplifier 310 prior to transmission. Signal 312 may also carry the high band RF frequency signal from divider 306 output and the high band RF frequency signal is further amplified by amplifier 314 prior to transmission. The RF frequency signals at the output of amplifier 310 and amplifier 314 may contain the amplified RF frequency signals which may over drive the LNA component at the receiver component 126 during the loop back self test operation. To this end, the amplified RF frequency signals in signal 224 and signal 226 may not be directly fed into the LNA component of the receiver component 126.

Figure 4:
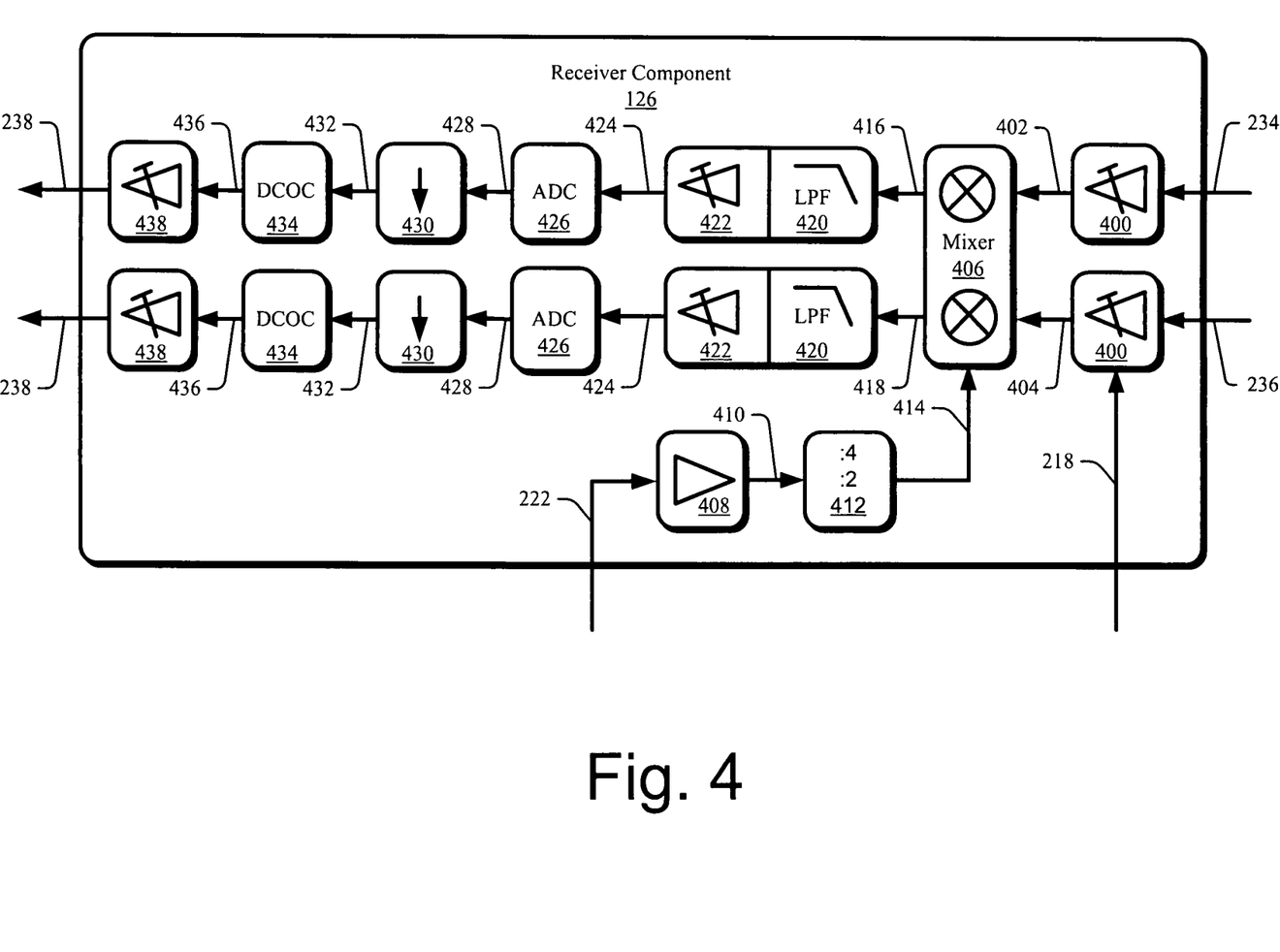
FIG. 4 is a block diagram of a receiver component.

FIG. 4 illustrates an implementation of receiver component 126 for the loop back self test using the functional circuit components by applying amplitude modulation. The receiver component 126 may contain most of the functional circuit components for applying amplitude modulation and demodulation of RF frequency signal for the loop back self test of the transceiver component.

A LNA 400 may receive the low band RF frequency signal 234 of and amplitude modulates the low band RF frequency signal 234 through toggling of LNA 400 gain. The toggling of LNA 400 gain may include manipulation from a high gain to low gain at a certain modulation frequency (e.g., 50.78 KHz). The toggling of LNA 400 gain may produce variations in the amplitude of the received low band RF frequency signal 234. The amplitude modulated low band RF frequency signal may contain: a frequency equivalent to the low band frequency (e.g., 850/900 MHz) plus the modulation frequency (e.g., 50.78 KHz) for the upper side band, and the low band frequency (e.g., 850/900 MHz) minus the modulation frequency (e.g., 50.78 KHz) for the lower sideband. The variations in the amplitude of the received low band RF frequency signal 234 may also result to LNA 400 performing the function of a parasitic mixer. The parasitic mixer may result when the gain of LNA 400 is toggled because the output may result to a modulated RF frequency signal. The toggling of gain may be implemented by switching bit in the digital circuit part of the receiver component 126 which may be initiated by a control signal from control/sequencing 128.

The LNA 400 may also receive high band RF frequency signal 236 and amplitude modulates the high band RF frequency signal 236 in the same manner as the low band RF frequency signal 234. The output of LNA 400 for the low band amplitude modulated RF frequency signal may pass through Signal 402 while the output of LNA 400 for the high band amplitude modulated RF frequency signal may pass through signal 404. The low band amplitude modulated RF frequency signal 402 and high band amplitude modulated RF frequency signal 404 may enter into a mixer 406 to undergo further frequency shifting as an intermediate step to reception or demodulation. The mixer 406 may combine the low band amplitude modulated RF frequency signal 402 or high band amplitude modulated RF frequency signal 404 with the receive frequency (oscillator frequency) to produce the IF signal after filtering.

During the test mode operation, the receive frequency (oscillator frequency) may be sourced from the multiplied RF frequency signal 222 which is amplified by an amplifier 408. The amplified multiplied RF frequency signal may pass through signal 410 and received by divider 412 to produce the low band RF frequency signal or the high band RF frequency signal. The low band RF frequency signal or high band RF frequency signal may contain the receive frequency (oscillator frequency) that passes through signal 414 and received by the mixer 406 for demodulation. The mixer 406 may combine the amplitude modulated RF frequency signal input at one side (e.g., low band amplitude modulated RF frequency signal 402 or high band amplitude modulated RF frequency signal 404), and the receive frequency (e.g., signal 414) which may contain the same frequency as the loop back transmit output signal (low band or high band) at the other input side. The mixer 406 may combine low band modulated RF frequency signal 402 and the low band receive frequency (oscillator frequency), or high band modulated RF frequency signal 404 and the high band receive frequency (oscillator frequency). A signal 416 may contain: the high frequency output which includes the sum of the low band receive frequency (oscillator frequency) and the amplitude modulated low band RF frequency signal 402, and the low frequency output (e.g., 50.78 KHz) which is the difference between the low band receive frequency (oscillator frequency) and the amplitude modulated low band RF frequency signal 402. Signal 418 may also contain: the high frequency output which includes the sum of the high band receive frequency (oscillator frequency) and the amplitude modulated high band RF frequency signal 404, and the low frequency output (e.g., 50.78 KHz) which is the difference between the high band receive frequency (oscillator frequency) and the amplitude modulated high band RF frequency signal 404.

A low pass filter 420 may be used to attenuate the high frequency output in signal 416 or signal 418 while allowing the low frequency IF signal (e.g., 50.78 KHz) to pass through the low pass filter 420. The output of the low pass filter 420 in both signal 416 or signal 418 may include the same low frequency IF signal. The low frequency IF signal may contain the amplitude modulation signal which includes the amplitude variation of the RF frequency signal in LNA 400. The low frequency IF signal may be further amplified through adjustable gain amplifier 422 to make the signal suitable for analog to digital conversion.

The output of adjustable gain amplifier 422 may pass through signal 424 and received by an analog to digital converter (ADC) 426. The ADC 426 may convert analog signals into digital signals. The digital signals from ADC 426 output may pass through signal 428 and received by a dowconverter 430. The downconverter 430 may be used to down sample the digital stream signal 428 due to high sampling rate in the ADC 426. A signal 432 may carry the output of downconverter 430 and received by direct current offset correction (DCOC) 434.

The DCOC 434 may cancel out an error signal (at very low frequency) added to the downconverter output signal 432 during the demodulation process. A signal 436 may carry the output of DCOC 434 and received by adjustable gain amplifier 438. The adjustable gain amplifier 438 may further enhance the quality of the DCOC output signal 436 which is measured at the test point 238 for the loop back self test of the transceiver component. The signal power strength of the adjustable gain amplifier 438 may now be the basis for the RF functional test of the transceiver component.

Figure 5:
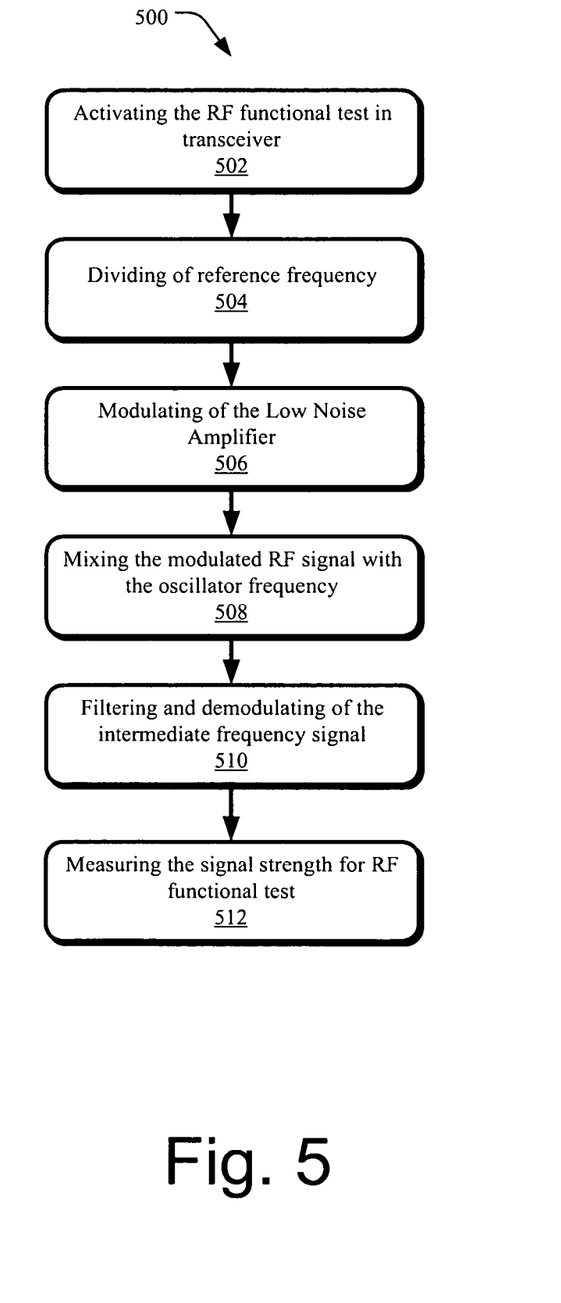
FIG. 5 is a flow chart illustrating a process for loop back self test using the functional circuit components by applying amplitude modulation.

FIG. 5 illustrates an exemplary method 500 for Radio Frequency (RF) functional test of a transceiver using the functional circuit components by applying amplitude modulation. In one implementation, the exemplary method 500 can be implemented in the transceiver 100. The exemplary method 500 is described with reference to FIGS. 1-4. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method can be implemented in any suitable hardware, software, firmware, or a combination thereof, without departing from the scope of the invention.

At block 502, activating the RF functional test in the transceiver is performed. A control/Sequencing component (e.g., control/sequencing component 128) introduces a test mode signal to enable the divider circuit (e.g., divider 130) and to turn on the transmitter component (e.g., transmitter component 120) and receiver component (e.g., receiver component 126) at the same time.

At block 504, dividing a reference frequency is performed. The reference frequency is used by the RF functional test. As an example, the divider 130 divides the reference frequency of the oscillator (e.g., oscillator 118) into a preset low modulation frequency used for amplitude modulation of the low noise amplifier (e.g., LNA 400) component in a receiver component (e.g., receiver component 126).

At block 506, modulating via the LNA component (e.g., LNA 400) is performed. The receiver component (e.g., receiver component 126) performs periodic switching of the LNA component (e.g., LNA 400) by toggling the LNA component (e.g., LNA 400) gain for amplitude modulation. The periodic switching may be initiated by the control signals from the control/sequencing component (e.g., control/sequencing 128) and is implemented by switching bit from the digital circuit part of the receiver component (e.g., receiver component 126).

At block 508, mixing the amplitude modulated RF frequency signal with the receive frequency (oscillator frequency) is performed. A mixer (e.g., mixer 406) may combine the amplitude modulated RF frequency signal with receive frequency (oscillator frequency) to produce the sum and difference of the frequencies.

At block 510, filtering and demodulating of the intermediate frequency (IF) signal is performed. The low pass filter (e.g., LPF 420) may allow the low modulation frequency component (IF) of mixer output (e.g., mixer 406) for further demodulation while attenuating the higher frequency component of the mixer output (e.g., mixer 406).

At block 512, measuring the signal strength of the received signal is performed. A test point in the receiver component (e.g., receiver component 126) may provide the signal strength used as the condition for the loop back self test of the transceiver. The signal strength measured is compared with the amplitude modulation implemented in the LNA component (e.g., LNA 400) in order to provide the pass or fail status of the transceiver component under test.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. For example, the different test and schemes may be configured to perform the RF functional test of a transceiver.

What is claimed is:

1. A transceiver comprising:
    a baseband component configured to receive data signals, and produce a baseband signal from the data signals; and
    a radio frequency (RF) component configured to receive the baseband signal, provide an RF frequency signal for transmission of the baseband signal, and perform a loop back RF functional test of the transceiver during a test mode of operation by applying a periodic amplitude modulation to a loop back RF frequency signal;
    wherein the periodic amplitude modulation is implemented by periodically toggling the gain of an amplifier component in a receiver path within the radio frequency (RF) component.

2. The transceiver of claim 1, wherein the RF component includes a single phase locked loop (PLL) component to transmit and receive a frequency.

3. The transceiver of claim 1, wherein the RF component is configured to perform the test mode operation by turning on power for a transmitter component and a receiver component at the same time.

4. The transceiver of claim 1, wherein the loop back RF functional test comprises a loop back transmit output signal fed into a receiver component through a needle connection that avoids over driving a low noise amplifier (LNA) component.

5. The transceiver of claim 1, further comprising:
    a signal strength measurement device configured to measure a signal strength associated with the amplitude modulated loop back frequency signal; and
    a comparator configured to compare the measured signal strength to a threshold and provide an output indicative of a pass or fail status of the transceiver based on the comparison.

6. A transceiver comprising:
    a baseband component configured to receive data signals, and produce a baseband signal from the data signals;
    a radio frequency (RF) component configured to receive the baseband signal, provide an RF frequency signal for transmission of the baseband signal, and perform a loop back RF functional test of the transceiver during a test mode of operation by applying a periodic amplitude modulation to a loop back RF frequency signal; and
    a low noise amplifier (LNA), wherein a gain of the LNA is toggled between a high gain and a low gain in a periodic manner for amplitude modulation of the loop back RF frequency signal.

7. The transceiver of claim 1 further comprising a built in self test frequency to set a modulation frequency used for amplitude modulation of the RF frequency signal.

8. The transceiver of claim 1 further comprising a mixer, wherein output of the mixer produces a sum and a difference of an amplitude modulated RF frequency signal and oscillator frequency.

9. The transceiver of claim 1 further comprising a divider, wherein output of the divider produces an oscillator frequency to be combined with an amplitude modulated RF signal.

10. The transceiver of claim 1 further comprising a low pass filter, wherein output of the low pass filter produces an intermediate frequency signal containing an amplitude modulation applied to the RF frequency signal.

* * * * *